(12) United States Patent
Zhang et al.

(10) Patent No.: US 10,976,335 B2
(45) Date of Patent: Apr. 13, 2021

(54) WIND MEASUREMENT APPARATUS BASED ON 3D NON-ORTHOGONAL ULTRASONIC SENSOR ARRAY

(71) Applicant: UNIVERSITY OF ELECTRONIC SCIENCE AND TECHNOLOGY OF CHINA, Sichuan (CN)

(72) Inventors: Wei Zhang, Chengdu (CN); Yanjun Li, Chengdu (CN); Zhenghua Gu, Chengdu (CN); Yibing Shi, Chengdu (CN); Fan Wang, Chengdu (CN); Wenqing Zhang, Chengdu (CN); Zhipeng Li, Chengdu (CN); Jian Zhou, Chengdu (CN); Zhipeng Zhan, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 16/451,917

(22) Filed: Jun. 25, 2019

(65) Prior Publication Data
US 2019/0317122 A1 Oct. 17, 2019

(30) Foreign Application Priority Data
Oct. 30, 2018 (CN) .......................... 201811276576.5

(51) Int. Cl.
*G01P 5/24* (2006.01)
*G01F 1/66* (2006.01)
(Continued)

(52) U.S. Cl.
CPC ................. *G01P 5/24* (2013.01); *G01F 1/667* (2013.01); *G01P 13/045* (2013.01); *G01S 15/885* (2013.01)

(58) Field of Classification Search
None
See application file for complete search history.

(56) References Cited

U.S. PATENT DOCUMENTS 5,521,883 A * 5/1996 Fage ..................... G01S 15/107
367/89
5,831,163 A * 11/1998 Okada .................... G01C 19/56
73/504.12

(Continued)

*Primary Examiner* — Peter J Macchiarolo
*Assistant Examiner* — Jermaine L Jenkins
(74) *Attorney, Agent, or Firm* — Oliff PLC (57) ABSTRACT

The present invention provides a wind measurement apparatus based on 3D (three dimensional) non-orthogonal ultrasonic sensor array, the ultrasonic sensor array is composed of two group of ultrasonic sensors, which are centrosymmetrically located at opposite sides, and the angle formed by connecting any two ultrasonic sensors at a side to the symmetry point O is less than 90°, the arrangement of 3D non-orthogonal ultrasonic sensor array reduces the generation of turbulence, thus, the accurate wind speed and wind direction is obtained. In the mean time, the central channel is employed to obtain a reference wind speed $v_{ref}$. Comparing the speed component $v_{central}$ along central channel of the wind under measurement with the reference wind speed $v_{ref}$, if the difference is less than a present threshold, then computing module outputs the measurement results, or discards them, thus the wind measurement accuracy is further improved.

5 Claims, 6 Drawing Sheets

(51) Int. Cl.
*G01P 13/04* (2006.01)
*G01S 15/88* (2006.01)

(56) References Cited

U.S. PATENT DOCUMENTS

| | | | | |
|---|---|---|---|---|
| 7,363,814 B2 | * | 4/2008 | Okada | G01C 19/56 |
| | | | | 73/504.04 |
| 9,612,252 B2 | * | 4/2017 | Waddington | G01P 5/24 |
| 2011/0149268 A1 | * | 6/2011 | Marchant | G01S 17/58 |
| | | | | 356/27 |
| 2017/0269117 A1 | | 9/2017 | Wang | |
| 2018/0095104 A1 | | 4/2018 | Peters | |
| 2019/0187167 A1 | * | 6/2019 | Chang | F03D 3/0409 |

* cited by examiner

PRIOR ART

FIG. 1

PRIOR ART

WIND MEASUREMENT APPARATUS BASED ON 3D NON-ORTHOGONAL ULTRASONIC SENSOR ARRAY

FIELD OF THE INVENTION

This application claims priorities under the Paris Convention to Chinese Patent Application No. 201811276576.5, filed Oct. 30, 2018, the entirety of which is hereby incorporated by reference for all purposes as if fully set forth herein.

The present invention relates to the field of wind measurement, more particularly to a wind measurement apparatus based on 3D (three dimensional) non-orthogonal ultrasonic sensor array.

BACKGROUND OF THE INVENTION

There have many kinds of anemometers used in various industries, and their working principles and measuring performances are different. Among them, the mechanical anemometers, such as cup anemometer and propeller anemometer, are most commonly used. The mechanical anemometer has some advantages, such as low cost, long history, universal use, perfect theory and measurement data. However, due to the existence of rotating parts in mechanical anemometer, it is easy to wear and tear, and at the same time, bad weather, dust and salt spray will cause corrosion. Because of friction, the minimum start-up wind speed still exists in mechanical anemometer, that is, the breeze below the minimum start-up wind speed cannot be measured. In addition, due to the different average methods of wind speed (scalar average and vector average), it still has "excessive effect", resulting in low measurement accuracy and restricted application fields.

With the rapid development of electronic industry, many new wind measurement apparatuses have emerged, for example laser anemometer, ultrasonic anemometer, highly integrated micro-electro-mechanical anemometer, hot-wire anemometer, Doppler anemometer. Generally speaking, these kinds of anemometers are small in size, long in service life and relatively high in measurement accuracy, moreover, have no mechanical rotating parts, therefore no special maintenance is needed during use. For the reason of above-mentioned advantages, they are gradually replacing the mechanical anemometer. And among them, ultrasonic anemometer is one of the most outstanding anemometers. It not only has simple structure and excellent durability, but also can achieve high measurement accuracy. However, the higher computing and processing capacity is required in corresponding processing circuit.

Ultrasonic wave refers to the acoustic signal which frequency is more than 20 kHz. It can propagate in the medium in the form of mechanical wave. For the characteristics of air flow are carried in the parameters such as velocity and frequency of the ultrasonic wave which propagates in air carry, ultrasonic wave can be used to measure the speed of wind. The working principle of ultrasonic anemometer is that: the transmitting circuit generates a high-voltage pulse to excite a acoustic transducer to transmit a ultrasonic signal. At the receiving end, a ultrasonic transducer based on piezoelectric effect is used to convert the ultrasonic signal into a electrical signal. After processing the electric signal, the wind speed can be extracted by measuring its time and frequency information. Compared with mechanical anemometer, its advantages mainly lie in the following aspects:

1). Ultrasonic anemometer is non-contact measurement and has little influence on the measured wind field;

2). Wind measurement is not affected by inertia and mechanical friction resistance, which is helpful to measure low speed wind;

3). There is no rotational inertia, and the measurement results will quickly respond to the wind speed;

4). Wind measurement is not affected by mechanical wear; Ultrasonic anemometer is easy to maintain, and can work stably in harsh environment for a long time.

It can be seen that the accuracy, measurement range and response speed of ultrasonic anemometer are better than those of mechanical anemometer. Common wind measurements based on ultrasonic wave and their working principle, advantages and/or disadvantages are shown in Table 1.

TABLE 1

| Method | Working Principle | Advantages and/or Disadvantages |
|---|---|---|
| Doppler measurement | When the air contains suspended particles, the ultrasonic wave will be scattered in the flowing air, then the Doppler frequency shift occurs. By measuring the Doppler frequency shift, the wind speed can be measured. | Doppler measurement is sensitive to the variation of wind speed. However, it needs to measure the current temperature, and requires that the air in the measured wind field contains suspended particles. |
| Wave velocity migration measurement | When ultrasonic wave propagates in the air, its velocity shift will occur. The value of the velocity shift is determined by the wind speed, wind measurement can be achieved by measuring the velocity shift | When measuring low speed wind, the velocity shift of ultrasonic wave is small. which makes the wind measurement error relatively large, so the measurement is only suitable for high speed wind. |
| Vortex street measurement | The wind field inside the pipeline will form a gas vortex, which is called as vortex street, at the leeward side of the bluff body. The frequency of the vortex street is related to the inner diameter of the pipeline and the wind speed. For the inner diameter of the pipeline is known, by detecting the frequency of the vortex street in the wind field, the wind speed can | The accuracy of vortex street measurement is high. However, the vortex street measurement is only applicable to the pipeline, so the wind measurement in open environment is not applicable, which limit its application |

TABLE 1-continued

| Method | Working Principle | Advantages and/or Disadvantages |
|---|---|---|
| | be calculated according to proportional relation between the frequency of the vortex street and the wind speed | |
| Correlation measurement | The maximum value characteristic is obtained according to the cross-correlation function, and the time delay between the ultrasonic transmission signal and the echo signal is determined by the peak value of the cross-correlation function, that is, wind speed is measured by measuring the transit time of the ultrasonic wave | The temperature affect on the measurement is avoided, the measurement accuracy is high. However, the price of the correlator is expensive, the circuit is relatively complicated, and the measurement is relatively immature and needs to be further improved. |
| Time-difference measurement | Time-difference measurement measures wind speed by measuring the time-difference between the travel times of ultrasonic wave from the point A to B and from point B to A. | The working principle is simple, and it is easy to realize in technology. The measurement accuracy is not affected by the environment (such as temperature and humidity). |

Comparing with other commonly used ultrasonic wind measurements, from Table 1, it can be seen that the time-difference measurement has the advantages of simple principle, easy realization and less influence by environmental factors. Therefore, the time-difference measurement is often considered in wind measurement.

Ultrasonic wave propagates in winds of different speeds, and its travel time is affected by wind speed. For the two arrival times (travel times) of ultrasonic wave under the conditions of downwind and upwind are not consistent, thus, the time-difference between the two arrival times occurs on the same propagating path. According to the time-difference of propagation and the distance between transmitting sensor and receiving sensor, the speed of the wind passed through the channel between transmitting sensor and receiving sensor can be measured through the time-difference. The wind speed of each channel in space is calculated in turn, and the speed and direction of the wind can be obtained by vector synthesis.

Figure 1:
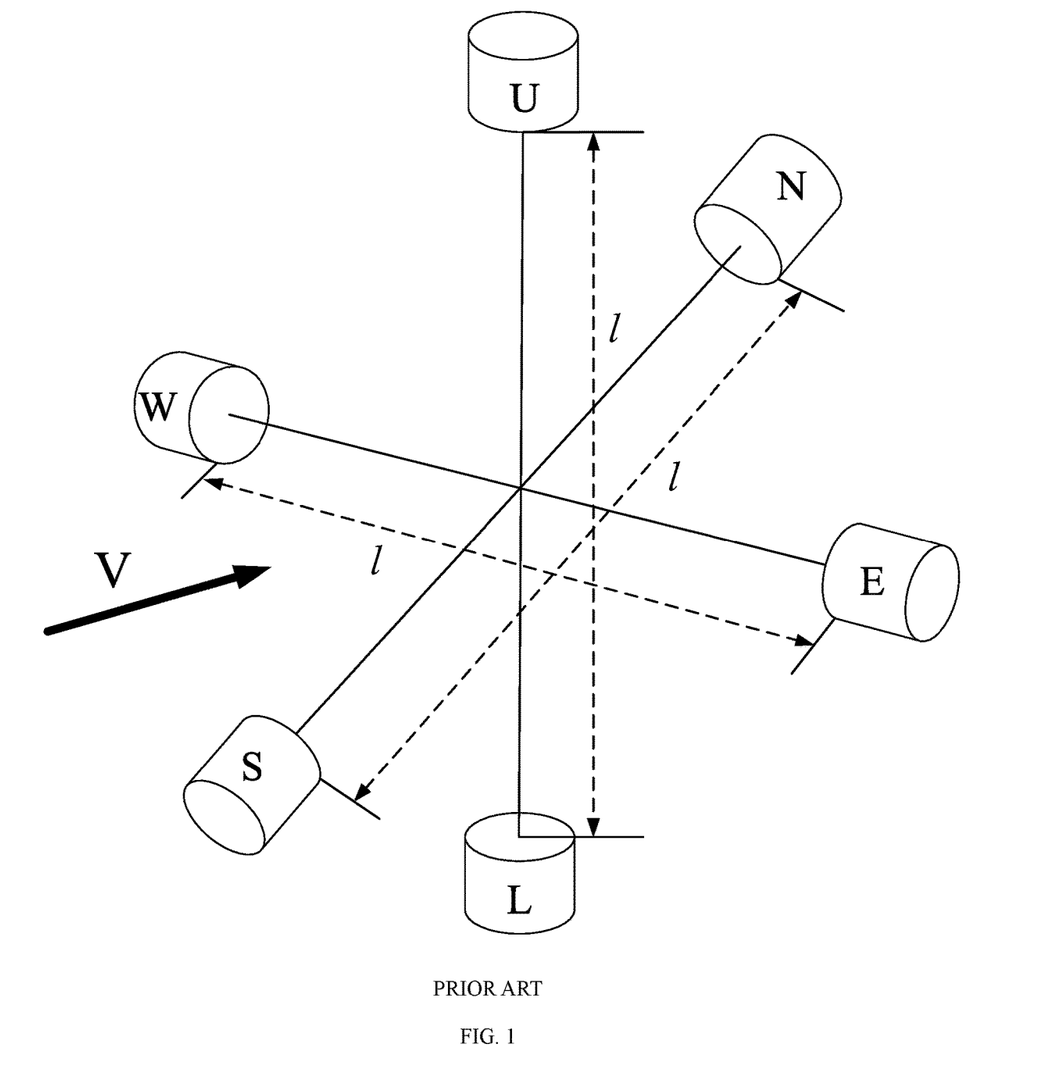
FIG. 1 is a diagram of a traditional 3D (three-dimensional) orthogonal ultrasonic sensor array for wind measurement in prior art.

To obtain the speed and direction of the wind, as shown in FIG. 1, a traditional 3D (three-dimensional) orthogonal ultrasonic sensor array is employed, which comprises three pairs of sensors, i.e. northern sensor (N) and southern sensor (S), western sensor (W) and eastern sensor (E), upper sensor (U) and lower sensor (L), and the distance of each pair of sensors is l. The traditional 3D orthogonal ultrasonic sensor array can be simplified as three two-dimensional orthogonal ultrasonic sensor arrays. Taking the horizontal plane for example, as shown in FIG. 2, the horizontal plane is composed of the northern sensor (N) and southern sensor (S), western sensor (W) and eastern sensor (E), the other two vertical planes are similar to the horizontal plane.

Figure 2:
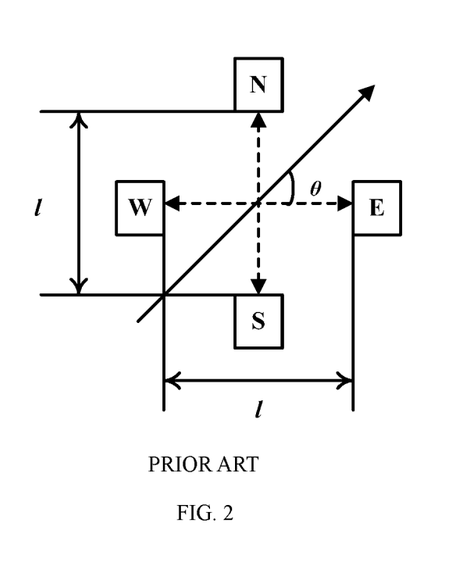
FIG. 2 is a diagram of a horizontal plane for wind measurement in prior art.

As shown in FIG. 2, the wind speed is V, and has an angle φ with the west-east direction, φ is also called as azimuth angle. Taking the west-east direction as an example, the travel time from the west to the east is $t_1$, the travel time from the east to the west is $t_2$, then there has the following relationship:

$$V_x = V\cos\varphi = \frac{l}{2}\left(\frac{1}{t_1} - \frac{1}{t_2}\right) = \frac{l}{2t_1 t_2}(t_2 - t_1) \quad (1)$$

where $V_x$ is the speed along the west-east direction.

Similarly, for the direction of south-north, the travel time from the south to the north is $t_1$, the travel time from the north to the south is $t_2$, then there has the following relationship:

$$V_y = V\sin\varphi = \frac{l}{2}\left(\frac{1}{t_3} - \frac{1}{t_4}\right) = \frac{l}{2t_3 t_4}(t_4 - t_3) \quad (2)$$

where $V_y$ is the speed along the south-north direction.

According to formula (1) and formula (2), the wind speed V and angle φ can be obtained. the way of calculation is extended to three-dimensional space, then there have the following relationships:

$$V_x = V\cos\theta\cos\varphi = \frac{l}{2}\left(\frac{1}{t_1} - \frac{1}{t_2}\right) = \frac{l}{2t_1 t_2}(t_2 - t_1) \quad (3)$$

$$V_y = V\cos\theta\sin\varphi = \frac{l}{2}\left(\frac{1}{t_3} - \frac{1}{t_4}\right) = \frac{l}{2t_3 t_4}(t_4 - t_3)$$

$$V_z = V\sin\theta = \frac{l}{2}\left(\frac{1}{t_5} - \frac{1}{t_6}\right) = \frac{l}{2t_5 t_6}(t_6 - t_5)$$

where $V_z$ is the speed along the lower-upper direction, θ is the pitch angle of the wind under measurement.

According to formulas (3), the speed V, azimuth angle φ and pitch angle θ of the wind under measurement can be obtained.

Despite of simple working principle, easy realization in technology, wind measurement apparatus based on traditional 3D (three-dimensional) orthogonal ultrasonic sensor array isn't the best solution, it has larger measurement errors, due to the turbulence generated by the arrangement of the orthogonal ultrasonic sensors.

SUMMARY OF THE INVENTION

The present invention aims to overcome the deficiencies of the prior art and provides a wind measurement apparatus based on 3D (three dimensional) non-orthogonal ultrasonic sensor array, so as to reduce the generation of turbulence, enhance the wind measurement accuracy and obtain accurate wind speed and wind direction.

To achieve these objectives, in accordance with the present invention, a wind measurement apparatus based on 3D (three dimensional) non-orthogonal ultrasonic sensor array is provided, comprising a 3D non-orthogonal ultrasonic sensor array, a computing module and a comparator, wherein:

the 3D non-orthogonal ultrasonic sensor array comprises eight ultrasonic sensors, the first four ultrasonic sensors are mounted at one side, the arrangement of the first four ultrasonic sensors is that one is at the center, the other three around it and form a equilateral triangle;

the second four ultrasonic sensors are mounted at the opposite side, the arrangement of the second four ultrasonic sensors is that one is at the center, the other three around it and form a equilateral triangle, the arrangement of the second four ultrasonic sensors is the centrosymmetric arrangement of the first four ultrasonic sensors;

the symmetry point of the first four ultrasonic sensors and the second four ultrasonic sensors is O, the angle formed by connecting any two ultrasonic sensors at a side to the symmetry point O is less than 90%;

two central ultrasonic sensors respectively at two sides form a central channel, the other ultrasonic sensor at one side and its centrosymmetric ultrasonic sensor at the opposite side form a measurement channel, thus three measurement channels are obtained; where the central channel is along the west-east direction or south-north direction, the wind speed measured by central channel is $v_{ref}$, the wind speeds measured by three measurement channels are $v_1$, $v_2$ and $v_3$ respectively;

the computing module calculates the speed v, azimuth angle φ and pitch angle θ of the wind under measurement according to the wind speeds $v_1$, $v_2$ and $v_3$, then the speed component $v_{central}$ along central channel of the wind under measurement is obtained according to the speed v, azimuth angle φ and pitch angle θ;

the comparator compares the speed component $v_{central}$ with wind speed $v_{ref}$ measured by central channel, if the difference of the speed component $v_{central}$ and wind speed $v_{ref}$ is less than a present threshold, the measurement results, i.e. the speed v, azimuth angle φ and pitch angle θ of the wind are correct, the comparator lets the computing module output the measurement results, or the measurement results are not correct, the comparator lets the computing module discard the measurement results.

The objectives of the present invention are realized as follows:

In the present invention, i.e. a wind measurement apparatus based on 3D (three dimensional) non-orthogonal ultrasonic sensor array, the ultrasonic sensor array is composed of two group of ultrasonic sensors, which are centrosymmetrically located at opposite sides, and the angle formed by connecting any two ultrasonic sensors at a side to the symmetry point O is less than 90°, the arrangement of 3D non-orthogonal ultrasonic sensor array reduces the generation of turbulence, thus, the accurate wind speed and wind direction is obtained. In the mean time, the central channel is employed to obtain a reference wind speed $v_{ref}$. Comparing the speed component $v_{central}$ along central channel of the wind under measurement with the reference wind speed $v_{ref}$, if the difference is less than a present threshold, then computing module outputs the measurement results, or discards them, thus the wind measurement accuracy is further improved.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

Figure 3:
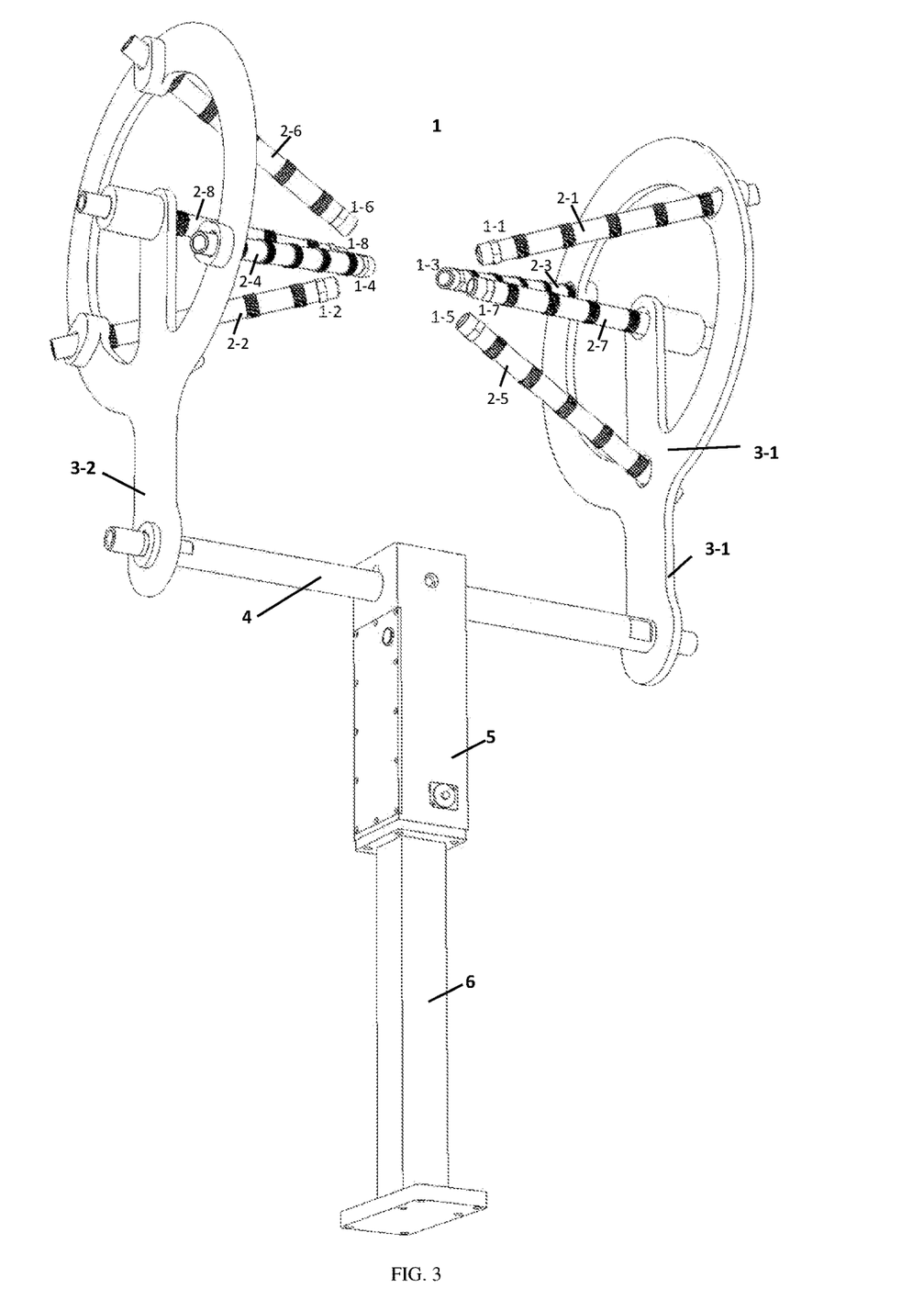
FIG. 3 is a structure diagram of a wind measurement apparatus based on 3D (three dimensional) non-orthogonal ultrasonic sensor array according to one embodiment of the present invention.

FIG. 3 is a structure diagram of a wind measurement apparatus based on 3D (three dimensional) non-orthogonal ultrasonic sensor array according to one embodiment of the present invention.

In one embodiment, as shown in FIG. 3, a structure diagram of a wind measurement apparatus based on 3D (three dimensional) non-orthogonal ultrasonic sensor array according to one embodiment of the present invention comprises a 3D non-orthogonal ultrasonic sensor array 1, eight hollow threaded rods 2-1, 2-2, . . . , 2-8, two pieces of annular supporting plate 3-1, 3-2, a horizontal supporting rod 4, a circuit box 5, a vertical supporting bracket 6, a computing module and a comparator. The 3D non-orthogonal ultrasonic sensor array 1 is composed of eight ultrasonic sensors 1-1, 1-2, . . . , 1-8. The computing module and the comparator are installed in circuit box 5 and not illustrated in FIG. 3.

Figure 4:
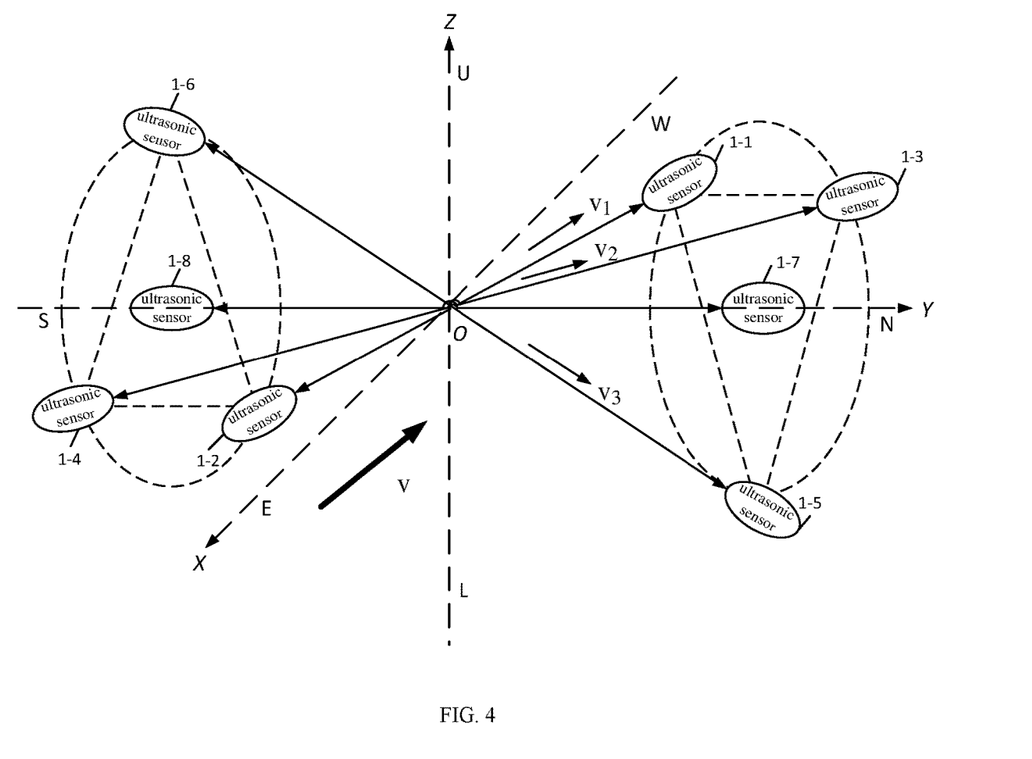
FIG. 4 is a diagram of a 3D (three dimensional) non-orthogonal ultrasonic sensor array according to one embodiment of the present invention.

As shown in FIG. 4, the 3D non-orthogonal ultrasonic sensor array 1 comprises eight ultrasonic sensors 1-1, 1-2, . . . , 1-8, the first four ultrasonic sensors 1-1, 1-3, 1-5, 1-7 are mounted at one side, the arrangement of the first four ultrasonic sensors 1-1, 1-3, 1-5, 1-7 is that one is at the center, the other three around it and form a equilateral triangle.

In the embodiment, As shown in FIG. 4, the first four ultrasonic sensors 1-1, 1-3, 1-5, 1-7 are mounted at northern side (N), the ultrasonic sensor 1-7 is at the center, the other three ultrasonic sensors 1-1, 1-3, 1-5 around it and form a equilateral triangle.

The second four ultrasonic sensors 1-2, 1-4, 1-6, 1-8 are mounted at the opposite side, the arrangement of the second four ultrasonic sensors 1-2, 1-4, 1-6, 1-8 is that one is at the center, the other three around it and form a equilateral triangle, the arrangement of the second four ultrasonic sensors 1-2, 1-4, 1-6, 1-8 is the centrosymmetric arrangement of the first four ultrasonic sensors 1-1, 1-3, 1-5, 1-7.

In the embodiment, as shown in FIG. 4, the second four ultrasonic sensors 1-2, 1-4, 1-6, 1-8 are mounted at southern side (S), the ultrasonic sensor 1-8 is at the center, the other three ultrasonic sensors 1-2, 1-4, 1-6 around it and form a equilateral triangle.

The symmetry point of the first four ultrasonic sensors 1-1, 1-3, 1-5, 1-7 and the second four ultrasonic sensors 1-2, 1-4, 1-6, 1-8 is O, the angle formed by connecting any two ultrasonic sensors at a side to the symmetry point O is less than 90°.

Except the central ultrasonic sensor 1-7, the angle formed by connecting any two ultrasonic sensors at northern side (N) to the symmetry point O is 60°, thus the ultrasonic sensors 1-1, 1-3, 1-5 and the symmetry point O form a regular triangular pyramid. Similarly, except the central ultrasonic sensor 1-8, the angle formed by connecting any two ultrasonic sensors at southern side (S) to the symmetry point O is 60°, thus the ultrasonic sensors 1-2, 1-4, 1-6 and the symmetry point O form another regular triangular pyramid.

Two central ultrasonic sensors 1-7, 1-8 respectively at two sides (northern side and southern side) form a central channel, the other ultrasonic sensor 1-1, 1-3, 1-5 at one side (northern side) and its centrosymmetric ultrasonic sensor 1-2, 1-4, 1-6 at the opposite side (southern side) form a measurement channel, thus three measurement channels are obtained, where the central channel is along south-north direction (or the west-east direction), i.e. from the ultrasonic sensor 1-8 to ultrasonic sensor 1-7, the wind speed measured by central channel is $v_{ref}$, the wind speeds measured by three measurement channels are $v_1$, $v_2$ and $v_3$ respectively In the embodiment, as shown in FIG. 4, the direction from the south (S) to the north (N) is taken as Y axis, the direction from the west (W) to the east (E) is taken as X axis, the direction from the lower (L) to the upper (U) is taken as Z axis. The first measurement channel is from the lower southwest to the upper northeast, i.e. from the ultrasonic sensor 1-2 to ultrasonic sensor 1-1, a wind speed measured by the first measurement channel is $v_1$. The second measurement channel is from the lower southeast to the upper northwest, i.e. from the ultrasonic sensor 1-4 to ultrasonic sensor 1-3, a wind speed measured by the second measurement channel is $v_2$. The third measurement channel is from the upper south to the lower north, i.e. from the ultrasonic sensor 1-6 to ultrasonic sensor 1-5, a wind speed measured by the third measurement channel is $v_3$. Thus the line connecting ultrasonic sensor 1-1 and ultrasonic sensor 1-3 is parallel to X axis, the line connecting ultrasonic sensor 1-2 and ultrasonic sensor 1-4 is also parallel to X axis. The third measurement channel is located on the vertical plane of Y-Z, so the wind speed $v_3$ is unrelated to X axis. If the wind blows from the south, all the measured wind speeds are positive, i.e. taking direction of Y axis as positive direction.

The computing module calculates the speed v, azimuth angle φ and pitch angle θ of the wind under measurement according to the wind speeds $v_1$, $v_2$ and $v_3$, then the speed component $v_{central}$ along central channel of the wind under measurement is obtained according to the speed v, azimuth angle φ and pitch angle θ.

In the embodiment, as shown in FIG. 4, the wind vector $\vec{v}$ is:

$$\vec{v} = [x, y, z] = \left[\frac{2\sqrt{3}}{3}(v_1 - v_2),\right. \tag{4}$$

$$\left.\frac{2\sqrt{3}}{9}(v_1 + v_2 + v_3), \frac{2}{3}(-2v_1 + v_2 + v_3)\right]$$

Then, based on geometric knowledge, the speed v, azimuth angle φ and pitch angle θ of the wind under measurement can be obtained according to the following equations:

$$v = |\vec{v}| = \sqrt{x^2 + y^2 + z^2} \tag{5}$$

$$\varphi = \begin{cases} \arctan\frac{y}{x} & \text{if } x > 0 \\ 180° + \arctan\frac{y}{x} & \text{if } x < 0 \text{ and } y \geq 0 \\ -180° + \arctan\frac{y}{x} & \text{if } x < 0 \text{ and } y < 0 \\ 90° & \text{if } x = 0 \text{ and } y > 0 \\ -90° & \text{if } x = 0 \text{ and } y < 0 \end{cases}$$

$$\theta = \arctan\frac{z}{\sqrt{x^2 + y^2}}$$

$$v_{ref} = y$$

The comparator compares the speed component $v_{central}$ with wind speed $v_{ref}$ measured by central channel, if the difference of the speed component $v_{central}$ and wind speed $v_{ref}$ is less than a present threshold, the measurement results, i.e. the speed v, azimuth angle φ and pitch angle θ of the wind are correct, the comparator lets the computing module output the measurement results, or the measurement results are not correct, the comparator lets the computing module discard the measurement results.

In the embodiment, as shown in FIG. 3, two pieces of annular supporting plate 3-1, 3-2 are located at northern side (N) and southern side (S) respectively, and mounted vertically at the two ends of the horizontal supporting rod 4, the first four ultrasonic sensors 1-1, 1-3, 1-5, 1-7 are mounted at northern annular supporting plate 3-1 through four hollow threaded rods 2-1, 2-3, 2-5, 2-7 respectively, the second four ultrasonic sensors 1-2, 1-4, 1-6, 1-8 are mounted at southern annular supporting plate 3-2 though another four hollow threaded rods 2-2, 2-4, 2-6, 2-8, respectively.

Figure 5:
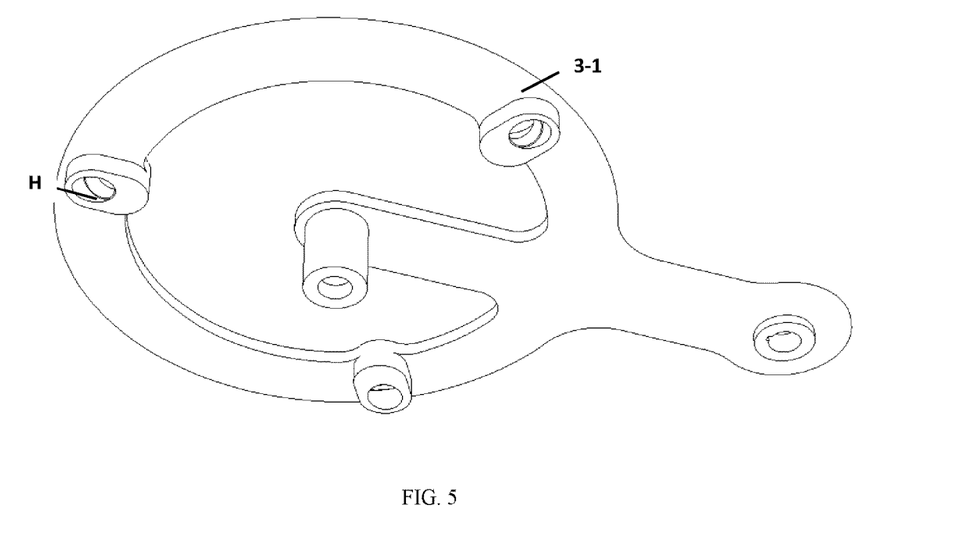
FIG. 5 is a structure diagram of annular supporting plate according to one embodiment of the present invention.
Figure 6:
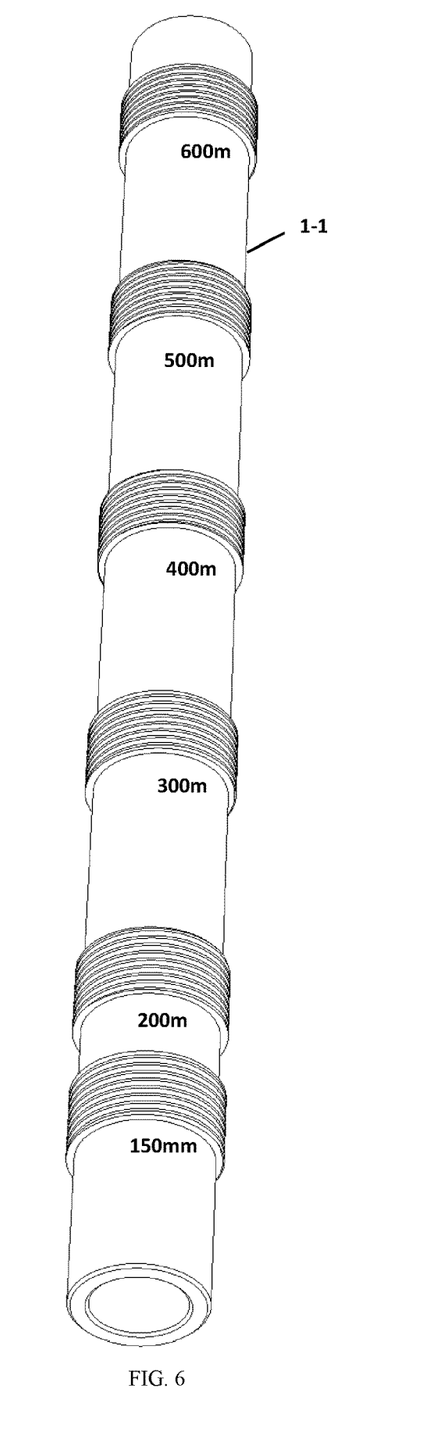
FIG. 6 is a structure diagram of a hollow threaded rod according to one embodiment of the present invention.

In the embodiment, as shown in FIG. 5, the annular supporting plate 3-1 at the northern side has four threaded holes H into which the four hollow threaded rods 2-1, 2-3, 2-5, 2-7 are screwed respectively. As shown in FIG. 6, each hollow threaded rod has 6 sections of threads, which correspond to 150 mm, 200 mm, 300 mm, 400 mm, 500 mm and 600 mm of transmitting distances, i.e. the distance of two ultrasonic sensors of a channel. the transmitting distance can be adjusted by screwing different section of thread into a hollow threaded rod. the lower end of the hollow threaded rod in FIG. 6 is screwed into a hollow threaded rod, the upper end of the hollow threaded rod in FIG. 6 is mounted with a ultrasonic sensor.

Figure 7:
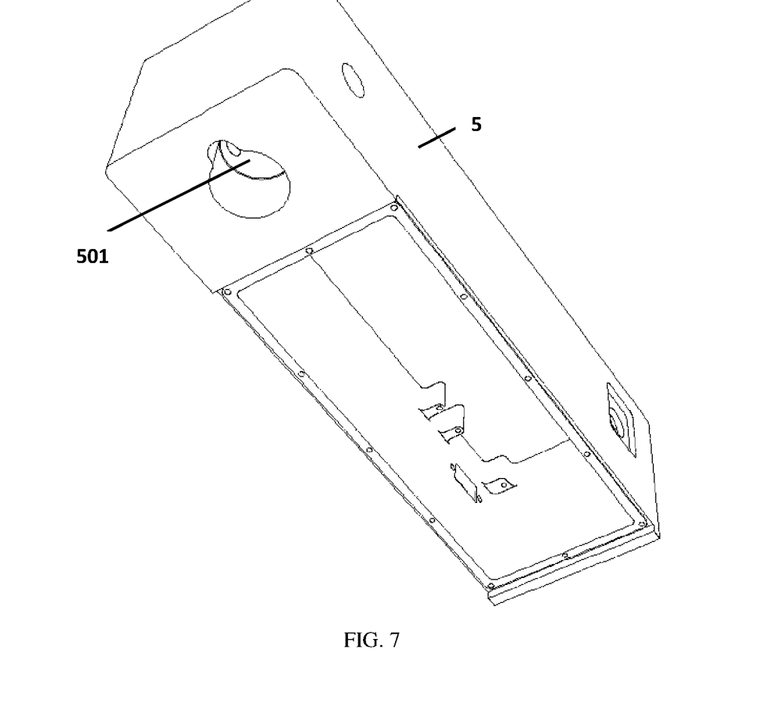
FIG. 7 is a structure diagram of a empty circuit box according to one embodiment of the present invention.
Figure 8:
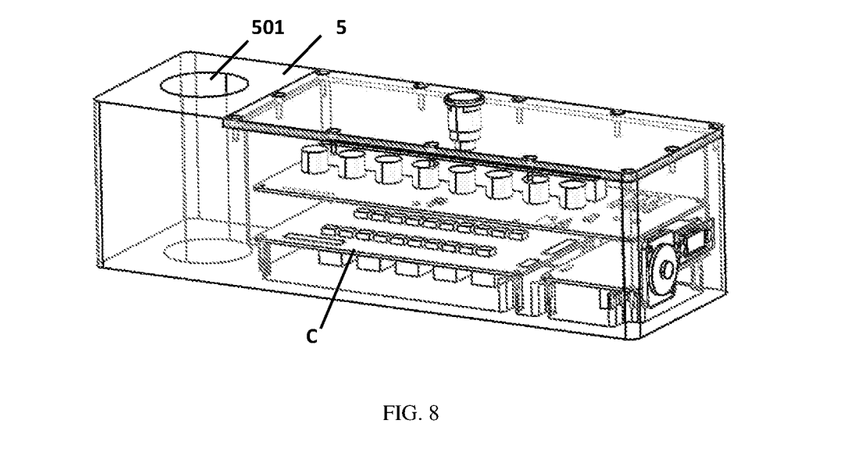
FIG. 8 is a structure diagram of a circuit box in which the circuit boards are installed according to one embodiment of the present invention.

In the embodiment, as shown in FIG. 3 and FIG. 7, the circuit box 5 has a horizontal hole 501 at the upper part, the horizontal supporting rod 4 passes the horizontal hole 501 and is fixed to the circuit box 5. The lower end face of the circuit box 5 is fixed to the upper end face of the vertical supporting bracket 6, and the lower end face of the vertical supporting bracket 6 is fixed at a installation position. The circuit board for computing module and the comparator, the main control board and the transmitting and receiving board for measuring wind speeds $v_1$, $v_2$, $v_3$ and $v_{ref}$ installed in the circuit box 5. the main control board and the transmitting and receiving board are conventional, and not described herein.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A wind measurement apparatus comprising:
a three-dimensional (3D) non-orthogonal ultrasonic sensor array, and
a processor and circuit configured to function as a computing module and a comparator, wherein:
the 3D non-orthogonal ultrasonic sensor array includes at least eight ultrasonic sensors such that:
a first at least four ultrasonic sensors are mounted at one side of the array, and the first at least four ultrasonic sensors are arranged where one ultrasonic sensor is at a center and other at least three ultrasonic sensors are grouped around the one ultrasonic sensor such that the at least three ultrasonic sensors form a equilateral triangle;
a second at least four ultrasonic sensors are mounted at an opposite side of the array, and the second four ultrasonic sensors are arranged where one ultrasonic sensor is at the center and the other at least three ultrasonic sensors are grouped around the one ultrasonic sensor such that the at least three ultrasonic sensors form a equilateral triangle, the arrangement of the second four ultrasonic sensors being a centrosymmetric arrangement to the first at least four ultrasonic sensors;
the symmetry point of the first at least four ultrasonic sensors and the second at least four ultrasonic sensors is O, the angle formed by connecting any two ultrasonic sensors at a side to the symmetry point O is less than 90°;
the two central ultrasonic sensors respectively at two sides form a central channel;
a non-central ultrasonic sensor at one side and its centrosymmetric ultrasonic sensor at the opposite side form a measurement channel such that at least three measurement channels are provided;
the central channel is along a west-east direction or a south-north direction, the wind speed measured by central channel is $v_{ref}$, the wind speeds measured by three measurement channels are $v_1$, $v_2$ and $v_3$ respectively;
the computing module is configured to:
calculate the speed v, azimuth angle φ and pitch angle θ of the wind under measurement according to the wind speeds $v_1$, $v_2$ and $v_3$, and
determine the speed component $v_{central}$ along central channel of the wind under measurement according to the speed v, azimuth angle φ and pitch angle θ;
the comparator is configured to:
compare the speed component $v_{central}$ with wind speed $v_{ref}$ measured by central channel,
in response to the difference of the speed component $v_{central}$ and wind speed $v_{ref}$ being less than a present threshold, determining that the calculation of the speed v, azimuth angle φ and pitch angle θ of the wind are correct, and outputting the calculated speed v, azimuth angle φ and pitch angle θ of the wind, and
in response to determining that the calculation of the speed v, azimuth angle φ and pitch angle θ of the wind not being correct, discarding the calculated speed v, azimuth angle φ and pitch angle θ of the wind.

2. The wind measurement apparatus based on 3D non-orthogonal ultrasonic sensor array according to claim 1, wherein:
the first at least four ultrasonic sensors are mounted at a northern side (N),
the second at least four ultrasonic sensors are mounted at a southern side (S), and
the symmetry point of the first at least four ultrasonic sensors and the second at least four ultrasonic sensors is O, and the angle formed by connecting any two ultrasonic sensors at a side to the symmetry point O is less than 90°.

3. The wind measurement apparatus based on 3D non-orthogonal ultrasonic sensor array according to claim 2, wherein:
except for the central ultrasonic sensor at the northern side (N), the angle formed by connecting any two ultrasonic sensors at northern side (N) to the symmetry point O is 60°;
the direction from the south (S) to the north (N) is taken as Y axis, the direction from the west (W) to the east (E) is taken as X axis, the direction from the lower (L) to the upper (U) is taken as Z axis;
the first measurement channel is from the lower southwest to the upper northeast, a wind speed measured by the first measurement channel is $v_1$, the second measurement channel is from the lower southeast to the upper northwest, a wind speed measured by the second measurement channel is $v_2$, the third measurement channel is from the upper south to the lower north, a wind speed measured by the third measurement channel is $v_3$;
in response to the wind blowing from the south, all the measured wind speeds are positive where the Y axis is taken as a positive direction;
the speed v, azimuth angle φ and pitch angle θ of the wind under measurement are obtained according to the following equations:

$$v = |\vec{v}| = \sqrt{x^2 + y^2 + z^2}$$

$$\varphi = \begin{cases} \arctan\frac{y}{x} & \text{if } x > 0 \\ 180° + \arctan\frac{y}{x} & \text{if } x < 0 \text{ and } y \geq 0 \\ -180° + \arctan\frac{y}{x} & \text{if } x < 0 \text{ and } y < 0 \\ 90° & \text{if } x = 0 \text{ and } y > 0 \\ -90° & \text{if } x = 0 \text{ and } y < 0 \end{cases}$$

$$\theta = \arctan\frac{z}{\sqrt{x^2 + y^2}}$$

$$v_{ref} = y$$

where:

-continued $$x = \frac{2\sqrt{3}}{3}(v_1 - v_2), y = \frac{2\sqrt{3}}{98}(v_1 + v_2 + v_3), z = \frac{2}{3}(-2v_1 + v_2 + v_3).$$

4. The wind measurement apparatus based on 3D non-orthogonal ultrasonic sensor array according to claim 1, further comprising:
eight hollow threaded rods, two pieces of annular supporting plate, a horizontal supporting rod, a circuit box and a vertical supporting bracket, wherein:
at least two pieces of annular supporting plates are located at northern side (N) and southern side (S) respectively, the at least two pieces of annular supporting plates are mounted vertically at the two ends of the horizontal supporting rod,
the first at least four ultrasonic sensors are mounted at the northern annular supporting plate through four hollow threaded rods respectively,
the second at least four ultrasonic sensors are mounted at the southern annular supporting plate though another four hollow threaded rods respectively,
the circuit box has a horizontal hole at the upper part, the horizontal supporting rod passes the horizontal hole and is fixed to the circuit box, the lower end face of the circuit box is fixed to the upper end face of the vertical supporting bracket, and the lower end face of the vertical supporting bracket is fixed at an installation position.

5. The wind measurement apparatus based on 3D non-orthogonal ultrasonic sensor array according to claim 1, wherein
each hollow threaded rod has 6 sections of threads, which correspond to 150 mm, 200 mm, 300 mm, 400 mm, 500 mm and 600 mm of transmitting distances, where the transmitting distances respectively correspond to a distance of two ultrasonic sensors of a channel, and
the transmitting distance is adjusted by screwing different section of thread into a hollow threaded rod.

* * * * *